（12）United States Patent
Takaku et al.

(10) Patent No.: US 6,209,441 B1
(45) Date of Patent: Apr. 3, 2001

(54) BRAKE BOOSTER

(75) Inventors: Hitoshi Takaku; Shuichi Nakamura; Yasumasa Morimitsu, all of Saitama-Ken (JP)

(73) Assignee: Jidosha Kiki Co., Ltd., Tokyo (JP)

( * ) Notice: Subject to any disclaimer, the term of this patent is extended or adjusted under 35 U.S.C. 154(b) by 0 days.

(21) Appl. No.: 09/262,467

(22) Filed: Mar. 4, 1999

(30) Foreign Application Priority Data

Mar. 27, 1998 (JP) .................................................. 10-100591

(51) Int. Cl.[7] .......................................................... F15B 9/10
(52) U.S. Cl. ........................................ 91/369.2; 91/376 R
(58) Field of Search ................................ 91/369.2, 376 R

(56) References Cited

U.S. PATENT DOCUMENTS

| 4,399,736 | * | 8/1983 | Schubert | ............................ 91/376 R |
| 4,793,242 | | 12/1988 | Kobayashi . | |
| 5,111,734 | | 5/1992 | Suzuki . | |
| 5,121,674 | | 6/1992 | Uyama . | |
| 5,386,760 | | 2/1995 | Goto et al. | ........................... 91/369.2 |
| 5,520,086 | | 5/1996 | Ikeda . | |
| 5,699,713 | * | 12/1997 | Mortimer | ........................... 91/376 R |
| 5,794,506 | | 8/1998 | Inoue et al. | .......................... 91/369.2 |
| 5,819,633 | | 10/1998 | Satoh | ................................... 91/369.2 |
| 5,823,089 | | 10/1998 | Inoue et al. | .......................... 91/369.2 |
| 5,893,316 | | 4/1999 | Inoue et al. | .......................... 91/369.2 |

FOREIGN PATENT DOCUMENTS 8-85442    2/1996    (JP) .

* cited by examiner

*Primary Examiner*—F. Daniel Lopez
(74) *Attorney, Agent, or Firm*—Flynn, Thiel, Boutell & Tanis, P.C.

(57) ABSTRACT

A brake booster includes reaction transmitting means comprising a first and a second retainer, a coiled spring disposed between the both retainers, and a stop which prevents the both retainers from being spaced from each other beyond a given distance. The brake booster also includes a valve mechanism comprising an annular first valve seat formed on the inner periphery of the valve body, a second valve seat formed on the rear portion of the valve plunger at a location radially inward of the first valve seat, and a valve element adapted to be seated upon either valve seat. A backup plate having a diameter less than the internal diameter of the first valve seat is embedded into the valve element. This arrangement allows a sufficient hysteresis to be obtained in a region where the valve element causes an expansion and shrinkage of the coiled spring in the reaction transmitting means to provide a better brake feeling than a conventional arrangement.

5 Claims, 4 Drawing Sheets

BRAKE BOOSTER

FIELD OF THE INVENTION

The invention relates to a brake booster, and more particularly, to a brake booster including a reaction transmitting means having a spring.

DESCRIPTION OF THE PRIOR ART

A brake booster is known in the art which is designed to produce a reduced servo ratio during an initial phase of a braking operation of the brake booster while increasing the servo ratio during a later phase of the braking operation.

A brake booster of the kind described includes reaction transmitting means disposed between a reaction disc and a valve plunger and comprising a first and a second retainer disposed to be displaceable relative to each other, a spring disposed between the first and the second retainer and resiliently charged to a preset load to maintain the both retainers spaced apart normally, and a stop member which prevents the first and the second retainer from becoming spaced beyond a given distance (see Japanese Laid-Open Patent Application No. 85,442/1996).

With such an arrangement, if a brake pedal is depressed to operate the brake booster, the reaction transmitting means merely transmits a brake reaction which is transmitted from the reaction disc to the valve plunger through the first retainer, the spring and the second retainer until the spring in the reaction transmitting means is compressed, whereby a prevailing servo ratio can be chosen to be relatively low to improve the maneuverability in a range where a low braking force is required.

On the other hand, when the spring in the reaction transmitting means is compressed, the second retainer and the valve plunger are advanced relative to the first retainer and a plate plunger by an amount corresponding to the compression of the spring, and this is equivalent to a further depression of the brake pedal by an amount corresponding to the compression of the spring. This allows the prevailing servo ratio to be set to a relatively high value to allow a braking force of an increased magnitude to be obtained with a reduced force of depression.

In the brake booster employing the reaction disc, the reaction disc is formed of an elastic material such as rubber to cause a hysteresis, a phenomenon that the magnitude of an output from the brake booster becomes different between upon depression and release of the brake pedal if the force with which the brake pedal is depressed is maintained constant.

In the presence of the hysteresis, there results an advantage that the brake feeling is improved in that if a driver ceases to increases the force to depress the brake pedal and slightly decrease the force unintentionally, the braking force of an equal magnitude is obtained.

However, with the brake booster mentioned above which includes the reaction transmitting means, as the spring in the reaction transmitting means is compressed, a compressive deformation of the reaction disc is reduced in a relative sense, whereby the flow path switching action of a valve mechanism in the brake booster takes place almost entirely through the expansion and shrinkage of the spring. As a consequence, because the hysteresis which the reaction disc exhibits becomes reduced during the expansion and shrinkage of the spring, there results a disadvantage that a change in the output from the brake booster becomes sensitive to a change in the force with which the brake pedal is depressed.

SUMMARY OF THE INVENTION

In view of the foregoing, it is an object of the invention to provide a brake booster which assures a good brake feeling if it includes reaction transmitting means having a spring.

Thus, the invention relates to a brake booster comprising a valve body slidably disposed within a shell, a valve mechanism disposed within the valve body, an input shaft for causing a valve plunger, which forms part of the valve mechanism, back and forth to switch a flow path in the valve mechanism, an output shaft slidably disposed on the valve body, a reaction disc interposed between one end of the output shaft and the valve plunger, and reaction transmitting means interposed between the reaction disc and the valve plunger for transmitting a brake reaction from the reaction disc to the valve plunger, and wherein the valve mechanism comprises an annular first valve seat formed on the inner periphery of the valve body, an annular second valve seat formed on a rear portion of the valve plunger at a location radially inward of the first valve seat, a valve element adapted to be seated upon either valve seat, and a backup plate formed by a rigid body embedded into the valve element. In accordance with the invention, the external diameter of the backup plate is chosen to be less than the internal diameter of the first valve seat and greater than the external diameter of the second valve seat.

With the described arrangement, as a brake pedal is depressed to drive the valve plunger and the valve element which is seated on the second valve seat which is formed on the valve plunger forward, the valve element will become seated upon the first valve seat on the valve body which remains stationary at a forward position and become removed from the second valve seat, thereby allowing the brake booster to be operated in the similar manner as in the conventional arrangement.

The valve element is not provided with a backup plate in an area thereof which is adapted to be seated upon the first valve seat, whereby the elastic deformation becomes increased in comparison to the elastic deformation which occurs when such area is provided with a backup plate.

As a consequence, the hysteresis that an output from the brake booster has different magnitudes between upon depression and release of the brake pedal can be enhanced by the area of the valve element which is adapted to be seated upon the first valve seat, thereby allowing a change in the output which has been sensitive to a change in the force with which the brake pedal is depressed to be moderated in a region where the expansion and shrinkage of the spring in the reaction transmitting means occurs. In this manner, an improved brake feeling can be obtained as compared with the conventional arrangement.

Above and other objects, features and advantages of the invention will become apparent from the following description of an embodiment thereof with reference to the attached drawings.

DETAILED DESCRIPTION OF EMBODIMENTS

Figure 1:
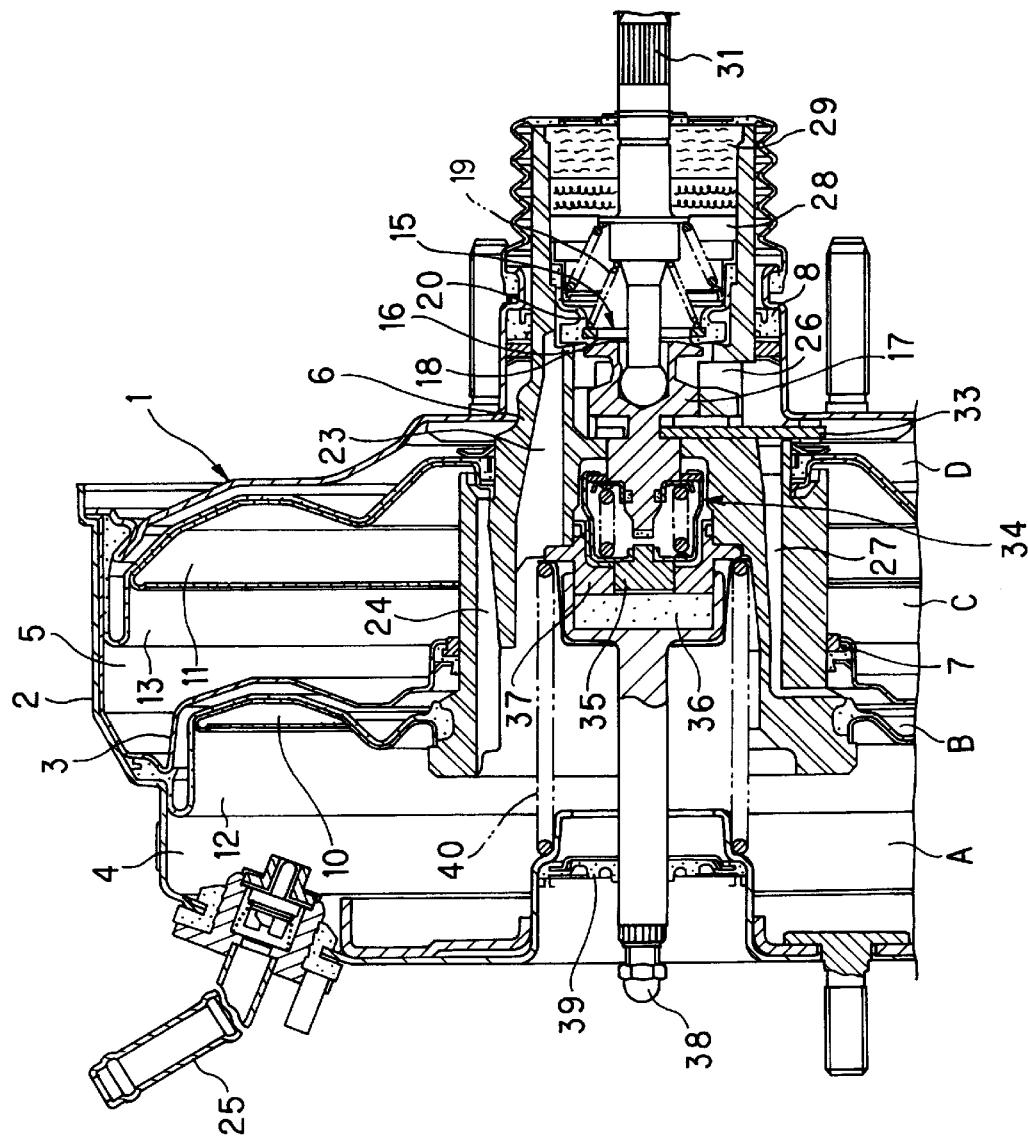
FIG. 1 is a cross section of a first embodiment of the invention.

Referring to the drawings, the invention will now be described with reference to an embodiment shown therein. Referring to FIG. 1, a tandem brake booster 1 includes a shell 2, the interior of which is partitioned by a center plate 3 into a front chamber 4 and a rear chamber 5 thereacross. A tubular valve body 6 slidably extends through a rear portion of the shell 2 and through the center plate 3, with seal means 7, 8 maintaining a hermetic seal thereat.

A front power piston 10 and a rear power piston 11 are connected around the outer periphery of the valve body 6 at locations which are situated within the front chamber 4 and the rear chamber 5, respectively, and a front diaphragm 12 and a rear diaphragm 13 are applied to the back surfaces of the power pistons 10, 11, respectively. A constant pressure chamber A and a variable pressure chamber B are defined across the front diaphragm 12 in the front chamber 4 while a constant pressure chamber C and a variable pressure chamber D are defined across the rear diaphragm 13 in the rear chamber 5.

Figure 2:
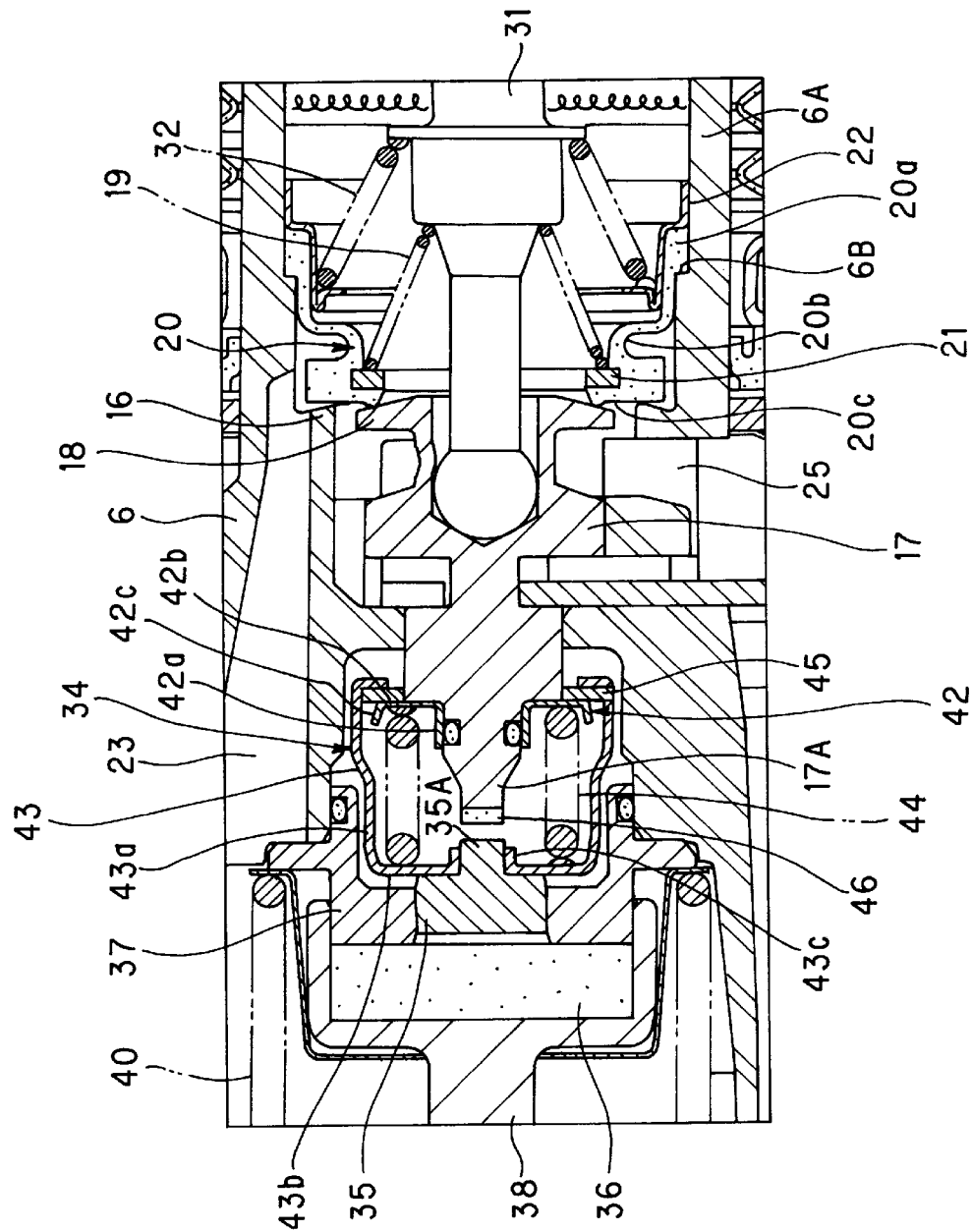
FIG. 2 is a cross section, to an enlarged scale, of part shown in FIG. 1.

A valve mechanism 15 which switches a communication between the constant pressure chambers A, C and the variable pressure chambers B, D is disposed within the valve body 6. Referring to FIG. 2, the valve mechanism 15 comprises an annular first valve seat 16 formed on the valve body 6, an annular second valve seat 18 formed on a rear portion of a valve plunger 17 which is slidably mounted on the valve body 6 at a location radially inward of the first valve seat 16, and a valve element 20 which is urged by a poppet return spring 19 to be seated upon either valve seat 16 or 18.

The valve element 20 includes a mount 20a which is mounted on the inner peripheral surface of a terminal tubular portion 6A of the valve body 6, a curved portion 20b of a reduced thickness which is curved radially inward from the mount 20a and then extends forwardly, and a seating portion 20c formed on the distal end of the curved portion 20b. A ring-shaped backup plate 21 formed by a rigid body is embedded into the seating portion 20c. One end of the popped return spring 19 abuts against the rear end face of the backup plate 21, thus urging the seating portion 20c to the left.

The mount 20a is fixedly mounted within the terminal tubular portion 6A of the valve body in a hermetically sealed manner by a step 6B formed on the internal peripheral surface of the terminal tubular portion 6A and a retainer 22 formed rearward of the mount 20a.

The seating portion 20c comprises an annular first seat S1 (FIG. 3) which contacts the first valve seat 16 and a second seat S2 (FIG. 3) which contact the second valve seat 18 at a location radially inward of the first seat S1. A space located radially outward of the first seat S1 communicates with the constant pressure chamber A through an axial constant pressure passage 23 formed in the valve body 6, and the constant pressure chamber A communicates with the constant pressure chamber C through another axial constant pressure passage 24 formed in the valve body 6. The constant pressure chamber A communicates with an intake manifold of an engine, not shown, through a tubing 25 mounted on the shell 2 for introducing a negative pressure, whereby a negative pressure is normally introduced into the constant pressure chambers A and C.

A space located between the first seat S1 and the second seat S2 communicates with the variable pressure chamber D through a radial variable pressure passage 26 formed in the valve body 6, and the variable pressure chamber D communicates with the variable pressure chamber B through an axial variable pressure passage 27 formed in the valve body 6.

A space located radially inward of the second seat S2 communicates with the atmosphere through a pressure passage 28 disposed in the terminal tubular portion 6A, with a filter 29 being disposed in the pressure passage 28.

Figure 3:
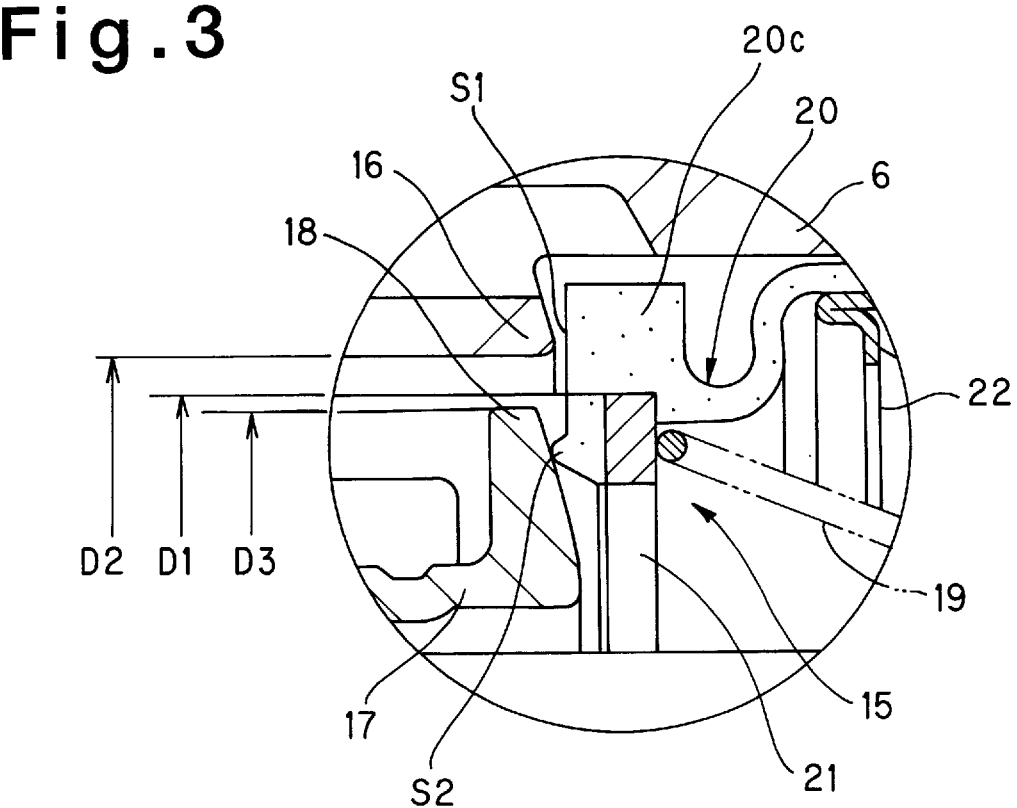
FIG. 3 is an enlarged cross section of a valve element 20.

As shown in FIG. 3, the backup plate 21 which is embedded in the seating portion 20c of the valve element 20 has an external diameter D1 which is less than the internal diameter D2 of the first valve seat 16 and greater than the external diameter D3 of the second valve seat 18. In the present embodiment, the first seat S1 has an increased wall thickness than the remainder by an amount corresponding to the absence of the backup plate 21 embedded therein.

Accordingly, when the first seat S1 becomes seated upon the first valve seat 16, it undergoes an elastic deformation which is increased by an amount corresponding to the absence of the backup plate 21 embedded therein, whereby its front end face will be greatly depressed.

While the first seat S1 has an increased wall thickness in the present embodiment, it should be understood that the invention is not limited thereto, but that it may be formed to a reduced thickness. In such instance, the first seat S1 will spring back rearwardly when it becomes seated upon the first valve seat 16.

The right end of the valve plunger 17 is pivotally connected with a distal end of an input shaft 31, and a valve return spring 32 having a greater resilience than the poppet return spring 19 is disposed between the input shaft 31 and the retainer 22 for normally causing the second seat S2 on the valve element 20 to be seated upon the second valve seat 18 on the valve plunger 17 and for causing the first seat S1 on the valve element 20 to be removed from the first valve seat 16 on the valve body 6. The other end of the input shaft 31 is mechanically coupled to a brake pedal, not shown.

A withdrawal of the valve plunger 17 is prevented by a key member 33, which is movable back and forth in the axial direction of the valve body 6 and which abuts against the internal surface of the shell 2 when the brake booster 1 is inoperative to maintain the valve plunger 17 at an advanced position relative to the valve body 6 to permit a lost motion of the input shaft 31 to be reduced at the commencement of operation of the brake booster 1.

Disposed forwardly of the valve plunger 17 are reaction transmitting means 34 to be described later, a plate plunger 35 and a reaction disc 36 in a sequential manner. The plate plunger 35 is slidably fitted into a holder 37 which is secured to the front end face of the valve body 6 while maintaining a hermetic seal thereat while the reaction disc 36 is received in a recess formed in one end of an output shaft 38. The recess formed in one end of the output shaft 37 is slidably fitted around the outer peripheral surface of the holder 37 while the other end or the distal end of the output shaft 38 projects externally of the shell 2 while maintaining a hermetic seal by means of a seal member 39, for connection with a piston of a master cylinder, not shown.

Accordingly, a brake reaction which is transmitted from the piston of the master cylinder is transmitted through the output shaft 38 to the reaction disc 36, and thence transmitted through the holder 37 to be accepted by the valve body 6 and also transmitted through the plate plunger 35, reaction transmitting means 34, the valve plunger 17 and the input shaft 31 to a brake pedal, not shown.

The valve body 6 and the power pistons 10, 11 are urged by a return spring 40 disposed between the shell 2 and the valve body 6 to be normally maintained in their inoperative positions shown.

As shown to an enlarged scale in FIG. 2, the reaction transmitting means 34 comprises a first retainer 42 and a second retainer 43, a coiled spring 44 disposed between the both retainers 42 and 43, and a stop 45 which prevents the withdrawal of the first retainer 42 from within the second retainer 43.

The first retainer 42 which is disposed rearwardly comprises an inner tubular portion 42a which is fitted around the base end of a projection 17A formed on the distal end of the valve plunger 17, a radial portion 42b extending radially outward from the rear end of the inner tubular portion 42a and abutting against a stepped end face on the valve plunger 17, and an outer tubular portion 42c extending forwardly from the outer periphery of the radial portion 42b.

On the other hand, the second retainer 43 which is disposed forwardly comprises an outer tubular portion 43a which surrounds the first retainer 42, a radial portion 43b extending radially inward from the front end of the outer tubular portion 43a and abutting against a stepped end face on the plate plunger 35, and an inner tubular portion 43c extending axially rearward from the inner periphery of the radial portion 43b and through which a projection 35A on the plate plunger 35 slidably extends.

The coiled spring 44 mentioned above is disposed between the radial portion 42b of the first retainer 42 and the radial portion 43b of the second retainer 43, and while the coiled spring 44 is compressed to a given degree, the ring-shaped stop 45 which is secured to the outer tubular portion 43a of the second retainer 43 is brought into abutment against the rear side of the first retainer 42, thus assembling the first retainer 42, the second retainer 43, the coiled spring 44 and the stop 45 in an integral manner.

Accordingly, a brake reaction from the plate plunger 35 is transmitted through the second retainer 43, the coiled spring 44 and the first retainer 42 to the valve plunger 17.

A disc-shaped resilient member 46 is mounted on the free end of the projection 17A of the valve plunger 17 which projects through the inner tubular portion 42a of the first retainer 42 and has a similar diameter as the projection 17A. In the inoperative condition, the resilient member 46 is spaced from the projection 35A on the plate plunger 35 which projects through the inner tubular portion 43c of the second retainer 43.

Accordingly, when a brake reaction from the plate plunger 35 exceeds the resilience of the coiled spring 44 to reduce the spacing between the first retainer 42 and the second retainer 43, the resilient member 46 ultimately abuts against the projection 35A of the plate plunger 35.

With the described construction, when a brake pedal is depressed to drive the input shaft 31 and the valve plunger 17 forward, the reaction transmitting means 34 is integrally driven forward while maintaining the condition illustrated in FIG. 2, and hence the plate plunger 35 is also driven forward until the force of depressing the brake pedal exceeds the preset load to which the coiled spring 44 is charged.

As the valve plunger 17 is driven forward, the valve element 20 which is seated on the second valve seat 18 formed thereon is driven forward, and becomes seated upon the first valve seat 16 formed on the valve body 6 which remains stationary at a forward position, and is then moved away from the second valve seat 18. This introduces the atmosphere into the variable pressure chambers B and D, producing a pressure differential between the constant pressure chambers A, C and the variable pressure chambers B, D. The pressure differential is effective to drive the power pistons 10, 11 and the valve body 6 forward, whereby the output shaft 38 is driven forward to produce a braking liquid pressure in the master cylinder.

Figure 4:
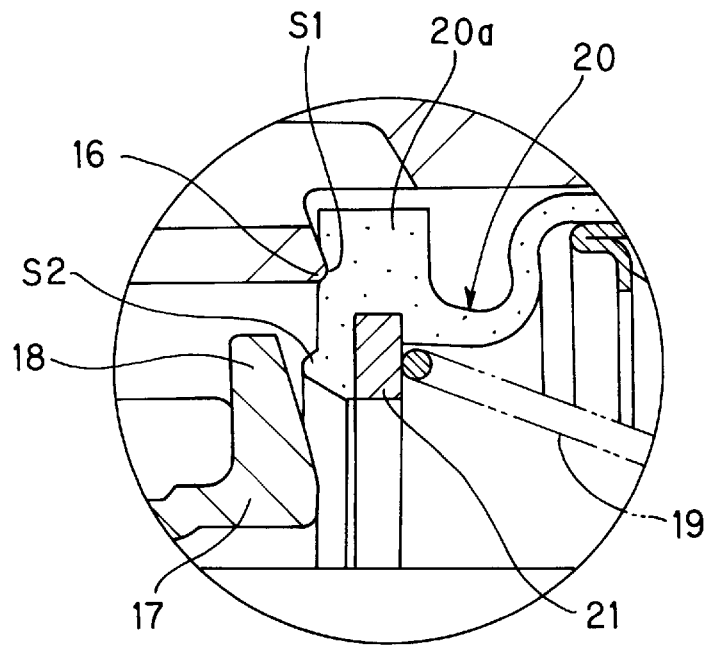
FIG. 4 is a cross section, to an enlarged scale, illustrating the seating of the valve element 20 on a first valve seat 16.

At this time, the first seat S1 on the valve element 20 which is seated upon the first valve seat 16 under the resilience of the valve return spring 19 is not provided with the backup plate 21 embedded therein, and accordingly, the front end face of the first seat S1 undergoes a large elastic deformation, followed by removal of the second valve seat 18 on the valve plunger 17 from the valve element 20 (see FIG. 4).

If an increase in the force with which the brake pedal is depressed is now ceased, the pressure differential between the constant pressure chambers A, C and the variable pressure chambers B, D drives the power pistons 10, 11 and the valve body 6 forward, and the valve element 20 which is seated on the first valve seat 16 eventually catches up with the second valve seat 18 on the valve plunger 17 to be seated thereon. In this manner, the valve element 20 is seated on both the first valve seat 16 and the second valve seat 18 to achieve a servo balance condition.

If the force with which the brake pedal is depressed is decreased under the servo balance condition, the valve element 20 will be caused to retract by the second valve seat 18 on the valve plunger 17, but because the first seat S1 on the valve element 20 has undergone a large elastic deformation as mentioned above, the first seat S1 is restored to its original condition from the large elastic deformation before it is removed from the first valve seat 16.

In other words, the servo balance condition continues from the time when an increase in the force with which the brake pedal is depressed is ceased until a reduction in the depressing force causes the valve element 20 to be removed from the first valve seat 16, and this is reflected as the hysteresis. In the present embodiment, the backup plate 21 is omitted from the first seat S1 as mentioned above so that the first seat S1 undergoes a large elastic deformation, and accordingly, the degree of the hysteresis can be enhanced in comparison to the prior art in which the such backup plate is also embedded in the first seat.

During the operation of the brake booster, a brake reaction from the braking liquid pressure is transmitted through the output shaft 38 to the reaction disc 36, and thence transmitted through the plate plunger 35, the reaction transmitting means 34, the valve plunger 17 and the input shaft 31 to the brake pedal.

Figure 5:
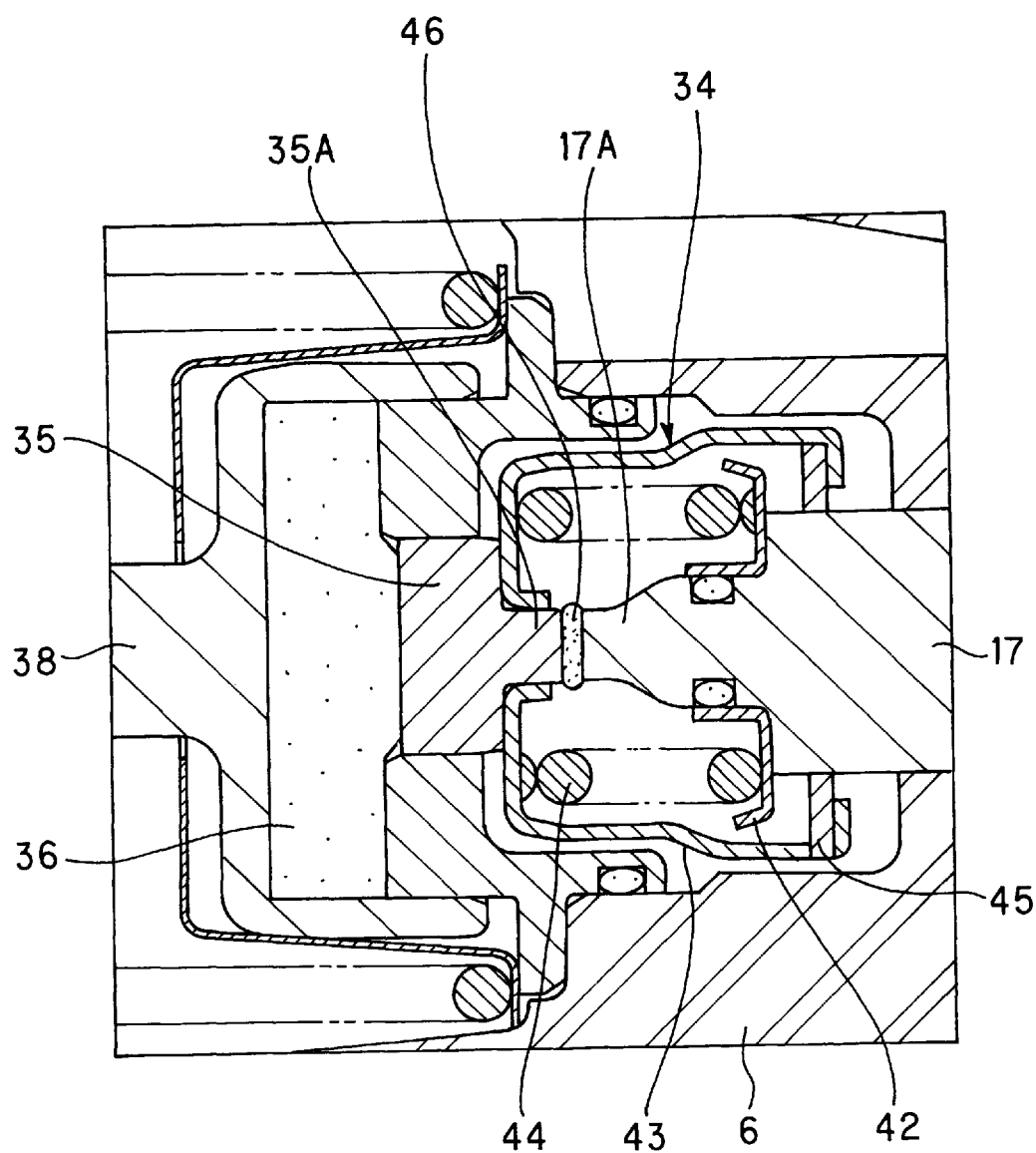
FIG. 5 is a cross section, to an enlarged scale, illustrating a compression of a resilient member 46.

When the brake reaction exceeds the preset load to which the coiled spring 40 in the reaction transmitting means 34 is charge d, the first retainer 42 and the valve plunger 17 will be relatively advanced with respect to the second retainer 43 and the plate plunger 35, as shown in FIG. 5, whereby the output from the brake booster 1 rises with a greater servo ratio than before.

When the valve plunger 17 is relatively advanced and the spacing between the plate plunger 35 and the valve plunger 17 is reduced, the resilient member 46 mounted on the valve plunger 17 eventually abuts against the projection 35A on the plate plunger 35 to be compressed between this projection and the valve plunger 17.

The reaction disc 36 is compressed by the brake reaction during the operation of the brake booster, and hence exhibits the hysteresis which depends on the characteristic of rubber used therefor. However, in the present embodiment, in addition, the resilient member 46 is compressed in a region of a greater brake reaction, and the hysteresis is also produced at this area. Thus, in addition to the hysteresis of a greater magnitude which results the large elastic deformation of the first seat S1 on the valve element 20, the hysteresis produced by the resilient member 46 in a region of a greater brake reaction is also obtained. In this manner, in a higher output region where the coiled spring 44, in particular, becomes compressed, a change in the output which has been sensitive to a change in the force with which the brake pedal is depressed can be moderated, allowing an improved brake feeling to be obtained.

It should be noted that the resilient member 46 described above in connection with the embodiment may be omitted.

The magnitude of the hysteresis can be arbitrarily established by choosing the external diameter D1 of the backup plate 21 suitably with respect to the internal diameter D2 of the first valve seat 16, but the external diameter D1 of the backup plate 21 must not be less than the external diameter D3 of the second valve seat 18.

In the described embodiment, a clearance is provided between the resilient member 46 and the projection 35A of the plate plunger 35 when the brake booster is inoperative, but the invention is not limited thereto and the resilient member may be initially disposed in abutment against the plate plunger.

While the invention has been shown and described above in connection with a preferred embodiment thereof, it should be understood that a number of changes, substitutions and modifications are possible therein without departing from the spirit and scope of the invention defined by the appended claims.

What is claimed is:

1. A brake booster comprising:
   a valve body slidably disposed within a shell, a valve mechanism disposed within the valve body, the valve mechanism including a valve plunger, an input shaft for moving the valve plunger back and forth to switch a flow path in the valve mechanism, an output shaft slidably disposed on the valve body, a reaction disc interposed between one end of the output shaft and the valve plunger, and reaction transmitting means interposed between the reaction disc and the valve plunger for transmitting a brake reaction from the reaction disc to the valve plunger,
   the valve mechanism including a first valve seat formed on the inner periphery of the valve body, a second valve seat formed on a rear portion of the valve plunger at a location radially inward of the first valve seat, a valve element adapted to be seated upon either valve seat, and a backup plate formed by a rigid body embedded in the valve element, the external diameter of the backup plate being less than the internal diameter of the first valve seat and greater than the external diameter of the second valve seat,
   the reaction transmitting means including a first retainer disposed toward the valve plunger, a second retainer disposed toward the reaction disc, a stop for preventing the first and second retainers from being spaced beyond a given distance, and a spring disposed between the first and second retainers and charged to a preset load, and
   a plate plunger disposed between the reaction disc and the valve plunger, the valve plunger being provided on its front side with a projection which projects through the first retainer, the plate plunger being provided on its rear side with a projection which projects through the second retainer, a resilient member being mounted on at least one of the projections so that when the spring is compressed, the resilient member is held between the both projections to undergo a compressive deformation.

2. The brake booster according to claim 1, wherein said first and second retainers are both free of contact with said valve body.

3. A brake booster, comprising:
   a valve body slidably disposed within a shell, a valve mechanism disposed within the valve body, the valve mechanism including a valve plunger, an input shaft for causing the valve plunger to move back and forth to switch a flow path in the valve mechanism, an output shaft slidably disposed on the valve body, a reaction disc interposed between one end of the output shaft and the valve plunger, and reaction transmitting means interposed between the reaction disc and the valve plunger for transmitting a brake reaction from the reaction disc to the valve plunger,
   the valve mechanism including an annular first valve seat formed on the inner periphery of the valve body, an annular second valve seat formed on a rear portion of the valve plunger at a location radially inward of the first valve seat, a valve element adapted to be seated upon either valve seat, and a backup plate formed by a rigid body embedded into the valve element, the external diameter of the backup plate being less than the internal diameter of the first valve seat and greater than the external diameter of the second valve seat,
   the reaction transmitting means including a first retainer disposed adjacent the valve plunger, a second retainer disposed adjacent the reaction disc, a stop for preventing both retainers from being spaced beyond a given distance, and a spring disposed between the first and second retainers and charged to a preset load, and
   a plate plunger interposed between the reaction disc and the valve plunger, the valve plunger having a front projection penetrating the first retainer, the plate plunger having a rear projection penetrating the second retainer, at least one of the front projection and the rear projection including an elastic member which is compressed between the front and rear projections with the spring being compressed.

4. The brake booster according to claim 3, wherein the first retainer has an inner guide, which receives the front projection, and the second retainer has an inner guide, which receives the rear projection.

5. The brake booster according to claim 3, wherein said first and second retainers are both free from contact with said valve body.

* * * * *